US012719816B2

(12) United States Patent
Huynh et al.

(10) Patent No.: US 12,719,816 B2
(45) **Date of Patent: *Aug. 25, 2026**

(54) CHAINED LOOKUPS AND COUNTING IN A NETWORK SWITCH

(71) Applicant: Marvell Asia Pte, Ltd., Singapore (SG)

(72) Inventors: Jeffrey Huynh, San Jose, CA (US); Weihuang Wang, Los Gatos, CA (US); Tsahi Daniel, Palo Alto, CA (US); Gerald Schmidt, San Jose, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 983 days.

This patent is subject to a terminal disclaimer.

(21) Appl. No.: 17/527,017

(22) Filed: Nov. 15, 2021

(65) Prior Publication Data

US 2022/0078137 A1 Mar. 10, 2022

Related U.S. Application Data

(63) Continuation of application No. 16/054,797, filed on Aug. 3, 2018, now Pat. No. 11,184,296.

(51) Int. Cl.

| | |
|---|---|
| ***H04L 49/25*** | (2022.01) |
| ***G06F 16/22*** | (2019.01) |
| ***G06F 16/953*** | (2019.01) |
| ***H04L 45/745*** | (2022.01) |
| ***H04L 45/748*** | (2022.01) |

(52) U.S. Cl.

CPC .......... *H04L 49/25* (2013.01); *G06F 16/2282* (2019.01); *G06F 16/953* (2019.01); *H04L 45/74591* (2022.05); *H04L 45/748* (2013.01)

(58) Field of Classification Search

CPC . H04L 49/25; H04L 45/74591; H04L 45/748; H04L 49/101; H04L 49/3063; G06F 16/2282; G06F 16/953

See application file for complete search history.

(56) References Cited

U.S. PATENT DOCUMENTS

| | | | | |
|---|---|---|---|---|
| 6,778,547 | B1 * | 8/2004 | Merchant ............ | H04L 49/9073 370/422 |
| 8,086,641 | B1 | 12/2011 | Carr | |
| 2003/0225881 | A1 * | 12/2003 | Saxena ................ | H04L 45/742 709/224 |
| 2014/0321467 | A1 * | 10/2014 | Wang .................... | H04L 45/745 370/392 |
| 2015/0373166 | A1 * | 12/2015 | Anand ................. | H04L 45/745 370/392 |

* cited by examiner

*Primary Examiner* — Shawn D Miller

(57) ABSTRACT

A network switch using a search engine to generate chained table lookup requests. After the search engine executes a first lookup, the next-pass logic in the search engine uses the first lookup result and information in the master key to generate a second lookup key as well as other parts of a second lookup request. A next-pass crossbar routes the second lookup request to a target memory, and the search logic executes the second lookup. The first lookup request may originate from a processing engine coupled to the search engine. The first and the second lookup results, if any, can then be returned back to the processing engine for further processing or decision making. The chain of lookups can be configured by software by specifying various operational parameters of the processing engines and the next-pass logic, including specifying a key construction mode for the second lookup.

20 Claims, 8 Drawing Sheets

CHAINED LOOKUPS AND COUNTING IN A NETWORK SWITCH

RELATED U.S. APPLICATION

This application is a continuation of and claims priority to the patent application with Ser. No. 16/054,797, filed Aug. 3, 2018, by J. Huynh et al., entitled "Chained Lookup and Counting in a Network Switch," now U.S. Pat. No. 11,184, 296, and hereby incorporated by reference in its entirety.

TECHNICAL FIELD

Embodiments of the present invention are related to the field of network switching, in particular to table lookup mechanisms in network switching.

BACKGROUND OF THE INVENTION

A network switch is a networking device that interconnects and manages communications among multiple devices in a computer network by using packet switching. A network switch typically includes control logic and operates to process received network packets through multiple processing stages and route the packets to other network devices. Ethernet network switches are a most common form of network switches.

Table search (or table lookup) has been widely adopted by the control logic of network switches. A network switch performs search operations on lookup tables maintained in the memory of the switch for an incoming packet and takes actions as instructed by the table search results or takes a default action in case of a table search miss. Table lookup is widely used for address lookup, Internet Protocol (IP) routing, packet accounting and statistics, Equal-Cost Multi-Path (ECMP), etc. As table lookup allows management of network services by decoupling decisions about the control plane of the switch from the data plane of the switch, it is especially important for Software Defined Networks (SDN).

Conventionally, in a network switch, a processing engine generates a table lookup request and sends the request to a search engine to perform a table lookup, where the search engine includes search logic and maintains lookup tables. Some lookup tables are counter tables designed for packet accounting and statistics purposes, these counter tables typically including dedicated logic and memory resources. If the lookup yields a match between the lookup key and a table entry, meaning a lookup result is produced, the search engine can output the lookup result back to the processing engine for further processing actions and decisions on the packet. If a second table lookup on the packet is needed, a second processing engine is used to generate a second lookup request and send it to the search engine for the second lookup. FIG. 1 illustrates the configuration of a search engine 110 in a network switch 100 in accordance with the prior art. The network switch 100 includes a flexible packet processing pipeline 120 coupled to a search engine 110. The search engine includes lookup memories arranged in pools (e.g., 111 and 112) and search logic 130 that implement various lookup tables. The pipeline 120 having multiple processing engines (e.g., programmable processing engines 121 and 122) and configured to process a packet through multiple stages based on table lookup results.

For each lookup to be performed for a packet, a separate processing engine is used to generate a lookup request and send it to the search engine 110 to execute. In the illustrated example, the dashed line 140 shows the communication flow between the pipeline 120 and the search engine 110 in the process of performing two lookups on a packet. The processing engine 121 generates a first lookup request based on a token of the packet that results from packet parsing and sends the request to the search engine 110. In response and according to information contained in the first lookup request, the search logic 130 locates a target lookup memory pool 111 that maintains the intended lookup table and searches the table. The first search result is returned back to the processing engine 121. Once the processing engine 121 determines that this packet needs a second lookup, it passes the first search result along with other information to another processing engine 122 which accordingly generates a second lookup request and sends it to the search engine 130. Based on the second lookup request, the search logic 130 locates the pool 112 that maintains the second lookup table and performs the second lookup. The second lookup result is provided back to the processing engine 122.

According to this conventional configuration, the processing engines in the pipeline 120 are relied upon to generate all the lookup requests for supplying to the search engine, and each search result is communicated from the search engine to the processing pipeline before generating the next lookup result. As typically one processing engine passes data to another processing engine through token fields, such communication traffic inevitably and undesirably consumes a substantial amount of bandwidth of the communication channels interconnecting the pipeline and the search engine, which contributes to communication latency and pipeline processing latency. Further, as a significant number of processing engines need to be configured for table lookup processing to meet the requirements for multiple lookups for an individual packet, the pipeline implementation can become complicated and costly.

SUMMARY OF THE INVENTION

Disclosed herein are systems and methods of network switching that involves generating chained table lookup requests within a search engine, thereby reducing bandwidth consumption of the communication channels between a processing pipeline and a search engine, simplifying processing pipeline configuration and enhancing processing pipeline efficiency.

Embodiments of the present disclosure utilize next-pass logic (herein also referred as "chained lookup logic" or "chained lookup and counting logic") resident in a search engine to generate a next-pass lookup request and direct the request to a target lookup memory for table searching. More specifically, after the search engine executes a first lookup, the next-pass logic in the search engine uses the first lookup result and information in the first lookup key to generate a second lookup request (or "next-pass request") which specifies a lookup key and a target lookup table. A next-pass crossbar switch routes the next-pass request to a memory containing the target lookup table, and the search logic executes the next-pass lookup. The first and the second lookup results, if any, can then be returned back to the processing pipeline for further processing or decision-making.

The first lookup request may originate from a processing engine coupled to the search engine. However, a next-pass request is generated by the next-pass logic in the search engine, instead of the processing engine as in the conventional approach. In the same manner, the next-pass logic may continue to generate additional next-pass requests based on the preceding lookup results. Thus, according to embodiments of the present disclosure, a chain of next-pass lookup requests (which may include one or more counting requests) can be automatically triggered in the search engine after a first lookup request is initiated at a processing engine. This can significantly reduce bandwidth consumption of the channels between a processing pipeline and a search engine and so improve processing pipeline efficiency. Also, the number of processing engines used to generate and process lookup requests can be advantageously decreased, thereby simplifying the design and configuration of the processing pipeline. Further, using next-pass logic in the search engine to generate chained lookup requests can advantageously reduce the requirements for passing data through tokens of packets among the processing engines.

In some embodiments, the processing engines and the next-pass logic are configurable by software with respect to lookups. For example, a next-pass configuration profile is defined for a packet and passes from a processing engine and the search engine, the profile specifying a range of parameters for configuring various components in the search engine to perform the lookup processes.

In some embodiments, next-pass logic may include computing logic configured to construct a lookup key according to a selected key construction mode. The mode is selected from a plurality of mode options based on the application and type of the lookup table. Key construction may include extracting a field of data from the first lookup result, combining data extracted from the first lookup result with a hash value, and/or extracting a field of data from a master key of the packet. The next-pass logic further includes a next-pass crossbar switch (or "crossbar" herein) operable to direct next-pass requests across lookup memory pools.

This summary contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying figures, in which like reference characters designate like elements.

DETAILED DESCRIPTION

Figure 1:
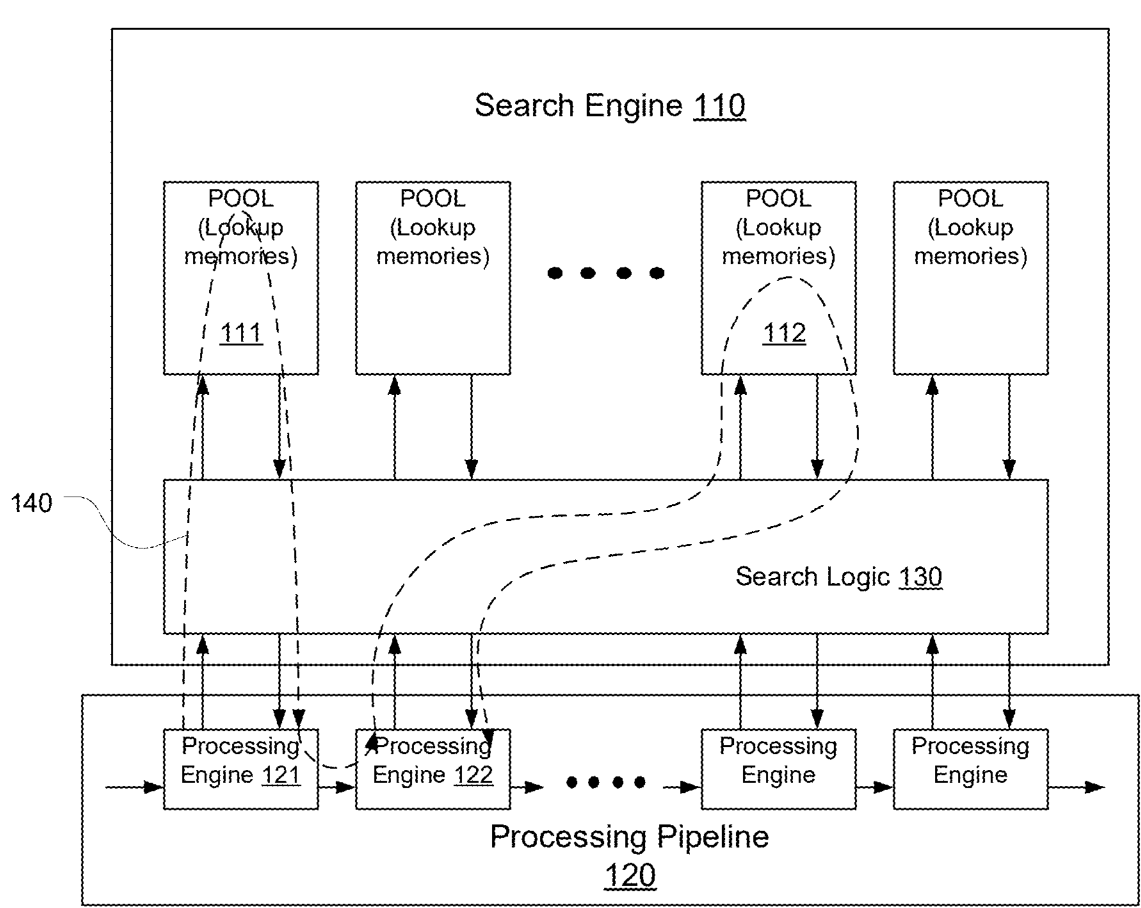
FIG. 1 illustrates the configuration of a search engine in a network switch in accordance with the prior art. The network switch includes a flexible packet processing pipeline coupled to a search engine.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the invention can be operated in any orientation.

Notation and Nomenclature

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "searching" or the like, refer to the actions and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or client devices. When a component appears in several embodiments, the use of the same reference numeral signifies that the component is the same component as illustrated in the original embodiment. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing"

or "accessing" or "executing" or "storing" or "searching" or the like, refer to the actions and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or client devices. When a component appears in several embodiments, the use of the same reference numeral signifies that the component is the same component as illustrated in the original embodiment.

Chained Lookup and Counting in a Network Switch

Herein the term "lookup" and "search" are used interchangeably. Unless specified otherwise, the lookup tables described herein include counting tables as well.

For a receive packet at a network switch, it is common to perform multiple lookups to achieve, for example, next-hop addresses for different network layers, flow statistics, per-port counting, Equal-Cost Multi-Path (ECMP) and etc. Embodiments of the present disclosure utilize a search engine to generate chained lookup requests and execute the lookups without relying on packet processing engines to generate each lookup request. This can effectively and advantageously offload tasks from processing engines and reduce communication flow between the processing engines and the search engine, thereby providing enhanced lookup efficiency as well as pipeline processing efficiency. In some embodiments, a search engine includes next-pass logic configured to generate one or more additional lookup requests responsive to a preceding lookup originated by a processing engine. That is, once a processing engine generates a first lookup request, next-pass lookups can be triggered and executed in the search engine without requiring additional processing engines. Thus, a chain of lookups can be performed by involving only one processing engine.

Figure 2:
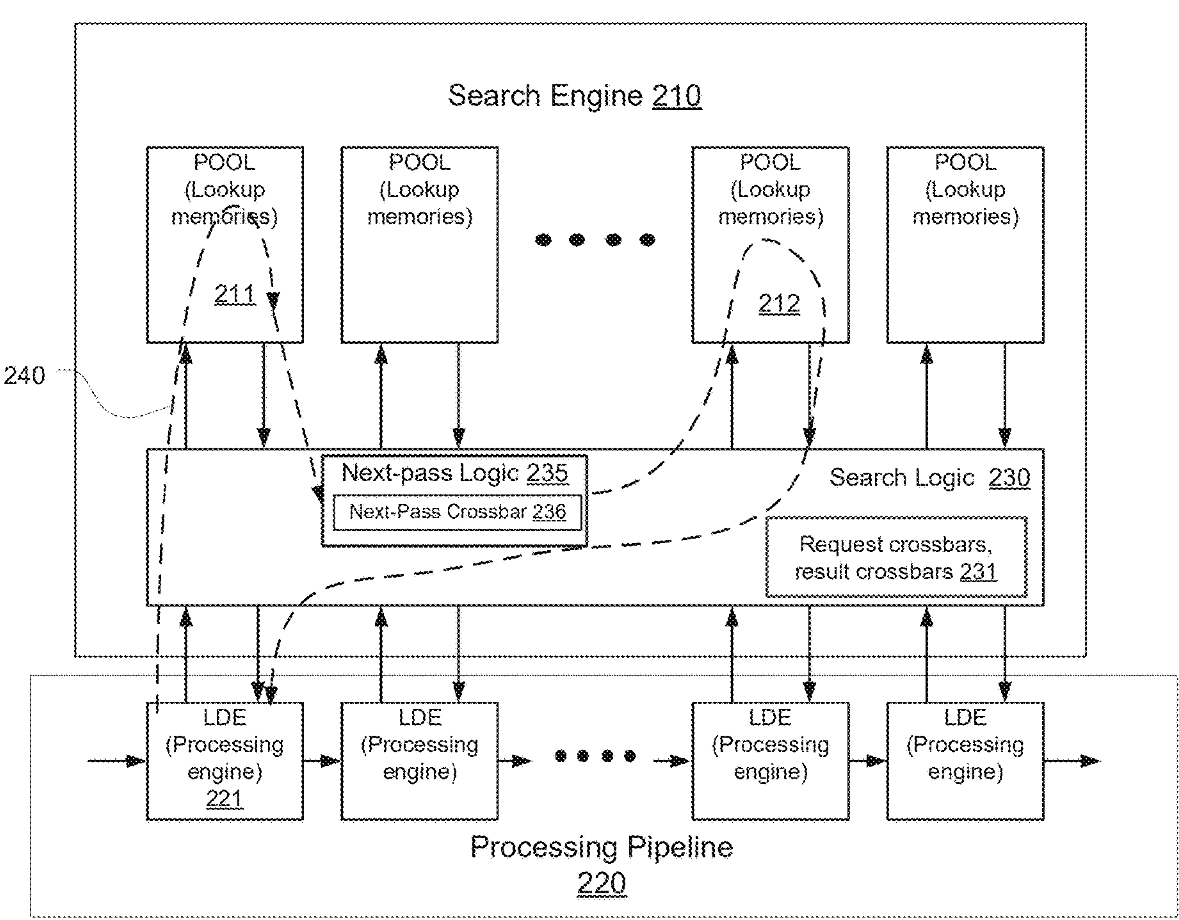
FIG. 2 illustrates the configuration of an exemplary network switch utilizing next-pass logic in a search engine to process one or more chained lookup requests in accordance with an embodiment of the present disclosure.

FIG. 2 illustrates the configuration of an exemplary network switch 200 utilizing next-pass logic 235 in a search engine to process one or more chained lookup requests in accordance with an embodiment of the present disclosure. The network switch 200 includes a packet processing pipeline 220 coupled to a search engine 210. The search engine 210 includes pools of lookup memories (e.g., 211 and 212) maintaining various lookup tables and search logic 230 for executing the lookups. In some embodiments, the search engine may include lookup tables implemented in hardware in application-specific platforms.

The pipeline 220 processes a packet through multiple stages based on table lookup results. In the examples described in detail herein, a processing pipeline includes a series of processing engines which includes programmable Lookup and Decision-Making Engines (LDEs) configured to generate lookup requests, e.g., 221. However, the present disclosure is not limited thereto. A processing engine and a processing pipeline may be implemented in any other suitable manner that is well known in the art.

Each LDE is configured to receive an input token of a packet from a parser or from a previous stage LDE, generate a lookup command including a lookup key, and process or modify an input token of the packet based on the search result. Generally, LDEs are protocol independent and allow users to fully program the conditions and rules with respect to table lookups and input token modification. The functionalities and configurations of exemplary LDEs are described in great detail in the commonly-owned U.S. Pat. No. 9,379,963, entitled "Apparatus and Method of Generating Lookups and Making Decisions for Packet Modifying and Forwarding in a Software-Defined Network Engine," the content of which is herein incorporated by reference in entirety for all purposes.

The present disclosure is not limited to any specific format or content of lookup requests. For example, a lookup request generated by the LDE may include a master lookup key, and a search profile ID for identifying a search profile that specifies configuration parameters for lookup operations. Based on the search profile, the search logic can determine the type of the target lookup table, the memory pool that includes the target look table, and how the search keys specific to the memory pool is formed. The lookup request may further include information representing the type of the request and the search command to be used.

In the illustrated example, the dashed line 240 shows the communication flow between the pipeline 220 and the search engine 210 in performing a chain of two lookups on a packet. The processing engine 221 first generates a first lookup request based on an input token and sends the request to the search engine 210. For example, the input token results from packet parsing. According to the first lookup request, the search logic 230 locates a target lookup memory pool 211 and searches the target lookup table contained therein. However, the discussions herein regarding memory arrangements and configurations are merely exemplary.

According to embodiments of the present disclosure, if the first lookup discovers an entry in the lookup table that matches the lookup key, or a "hit" is resulted, the next-pass logic 235 in the search engine 210 may be used to process a next-pass lookup, in series or in parallel. More specifically, the next-pass logic 235 receives the first lookup result including the hit address and control data in the matching entry, along with a portion of the master key (e.g., a 40-bit parameter and a 16-bit count value; for example, the packet length byte-count), and constructs the next-pass lookup and/or count request using a next-pass configuration profile, as described in greater detail with reference to FIG. 4. The second lookup request may include a second lookup key, a search profile ID, the type of second lookup table to be searched, the memory pool that includes the second lookup table, and how the search keys specific to the memory pool is formed, the type of the request and the search command to be used, and/or any other information that is well known in the art. The next-pass logic 235 also includes, or is coupled to, a next-pass crossbar 236 operating to routing the second lookup request to the target memory pool 212 for the search logic to execute the second lookup. The first lookup result and the second lookup result, if any, are then returned to the initial requesting LDE 221 for further processing or decision-making with respect to the packet.

In some embodiments, next-pass logic in a search engine is dedicated to a process next-pass lookups of a certain type, e.g., a direct index lookup. However, in some other embodiments, next-pass logic is capable of initiating and processing any type of table lookups in the network switch. Further, next-pass logic may be implemented to generate a single next-pass only or a chain of multiple next-passes.

It will be appreciated that the present disclosure is not limited to any specific type of next-pass lookup tables or functionalities of the tables; nor is it limited to any specific construction of next-pass lookup keys. Like the lookup requests generated by the LDEs, next-pass lookups may be used for a wide range of purposes, such as per-port packet accounting, flow statistics, ECMP, etc. Examples of the table lookup performed in the network switch 200 include: hashing for a Media Access Control (MAC) address look up, Longest-Prefix Matching (LPM) for Internet Protocol (IP)

routing, Wild Card Matching (WCM) for an Access Control List (ACL) and direct memory access for control data or accounting and flow statistics (e.g., per-port counting).

Each lookup memory pool (e.g., 211 or 212) may be composed of one or more types of memory, such as static random-access memory (SRAM) and ternary content-addressable memory (TCAM). A SRAM may support direct memory access and a TCAM may be used for longest prefix match (LPM) and access control list (ACL) searches. However, this discussion is merely exemplary. In some embodiments, a lookup table to be searched may reside entirely in one memory pool; whereas in some other embodiments, the table may reside across multiple memory pools.

In some embodiments, the next-pass logic 235 may generate more than one lookup requests, which can be executed concurrently in different lookup tables. For example, one next-pass lookup is performed on a counting table which only results in an update of an entry in the table; and the other next-pass lookup is expected to yield a lookup result. In another example, two concurrent next-pass lookups may both yield lookup results which can be returned to the LDE simultaneously. However, it will be appreciated that in general a counting table lookup may also return a lookup result.

The next-pass logic may construct a next-pass lookup key based on the first lookup result, particularly the control data in the lookup result, a master key, metadata inherited from a first lookup command, and configurations specified in a next-pass lookup profile. In some embodiments, the search engine is configured to transmit a lookup result back to the requesting LDE as a plurality of (e.g., four) result lanes. Each result lane represents a portion of the search results. As such, the search engine may take multiple cycles to return the lookup result completely to the requesting LDE. Hence the metadata may indicate the source LDE, the request ID, the command ID, start/end result data lane, etc.

Particularly, one common use case is per input port packet accounting, e.g., for traffic hitting each forwarding database rule. In a conventional network switch that does not include next-pass logic in a search engine, an extra processing engine is needed to compute the address of the per-port counter and perform the lookup. Next-pass logic according to the present disclosure can independently compute the counter address. Per-port accounting can use lookup memory pools to maintain the lookup tables, therefore advantageously eliminating the need for separate per-port memories. ECMP is another common use-case of lookup tables. Next-pass logic may provide ample modulo operation capabilities and different address modes to accommodate different ECMP scenarios and performance requirements, whereas LDEs typically are not equipped to perform modulo operations. Moreover, next-pass logic can be used to increment hit event counters or byte counters for flow statistics.

Figure 3:
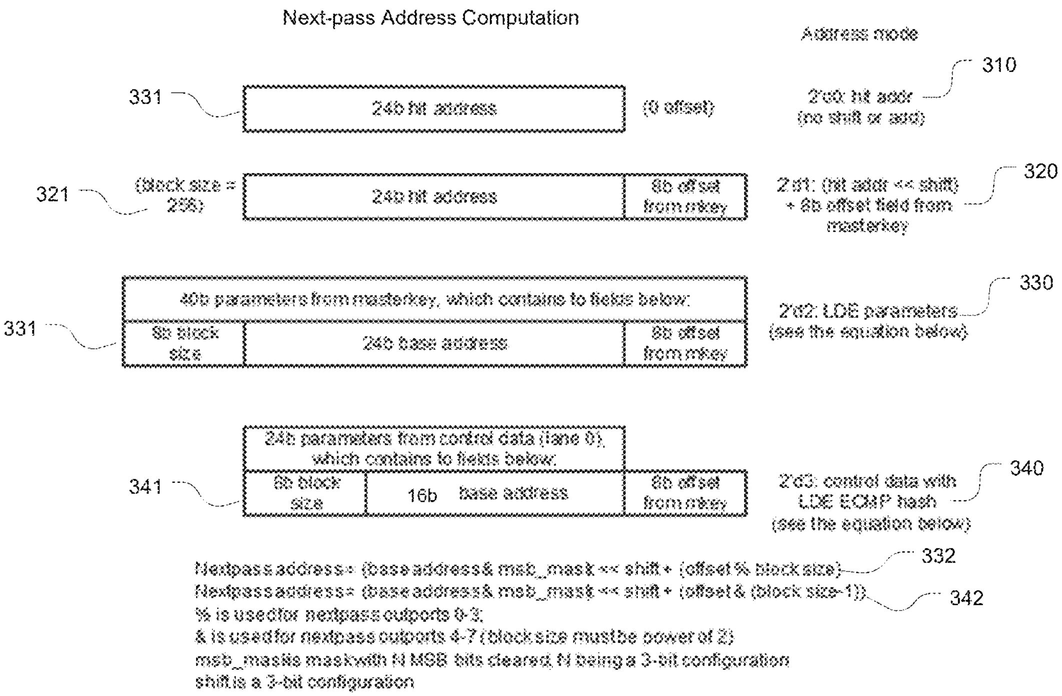
FIG. 3 shows a plurality of key construction modes (or "address mode") that exemplary next-pass logic can select to generate a next-pass lookup key in accordance with an embodiment of the present disclosure.

The next-pass logic 235 may include arithmetic logic units (ALUs) configured to construct a key corresponding to the lookup table to be searched. FIG. 3 shows a plurality of key construction modes (or "address mode" herein) that exemplary next-pass logic can select to generate a next-pass lookup key in accordance with an embodiment of the present disclosure. In the address mode 310, the next-pass logic extracts a 24-bit hit address from the first lookup result without SHIFT or ADD operations and uses it directly as the lookup key 311. In some embodiments, the address mode 310 is used if the next-pass lookup is for counting only. There can be an option to carry a 16-bit bye-count together with a counter update code from the master key.

In the address mode 320, a key 321 is derived from a 24-bit hit address from the first lookup result plus an ECMP hash value, which can be obtained from an 8-bit offset from the master key and implemented using SHIFT operations.

In the address mode 330, a key 331 is derived from the 40-bit parameters extracted from the master key, including an 8-bit block size, a 24-bit based address, and an 8-bit offset from the master key. The computation logic for deriving the key 331 is shown in equation 332. In the address mode 340, a key 341 is derived from 24-bit parameters extracted from the control data (8-bit block size and 16-bit based address) plus an ECMP hash value (8-bit offset from the master key). The computation logic for deriving the key 341 is shown in equation 342.

Figure 4:
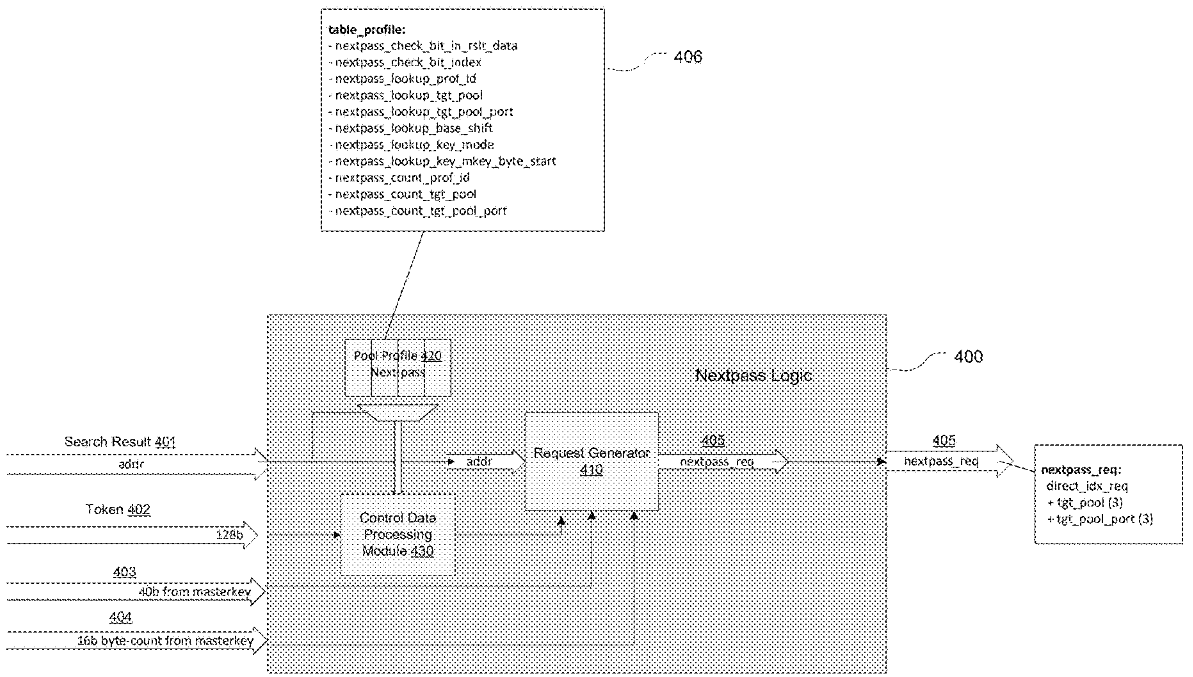
FIG. 4 illustrates an exemplary configuration of exemplary next-pass logic in a search engine in accordance with an embodiment of the present disclosure.
Figure 5:
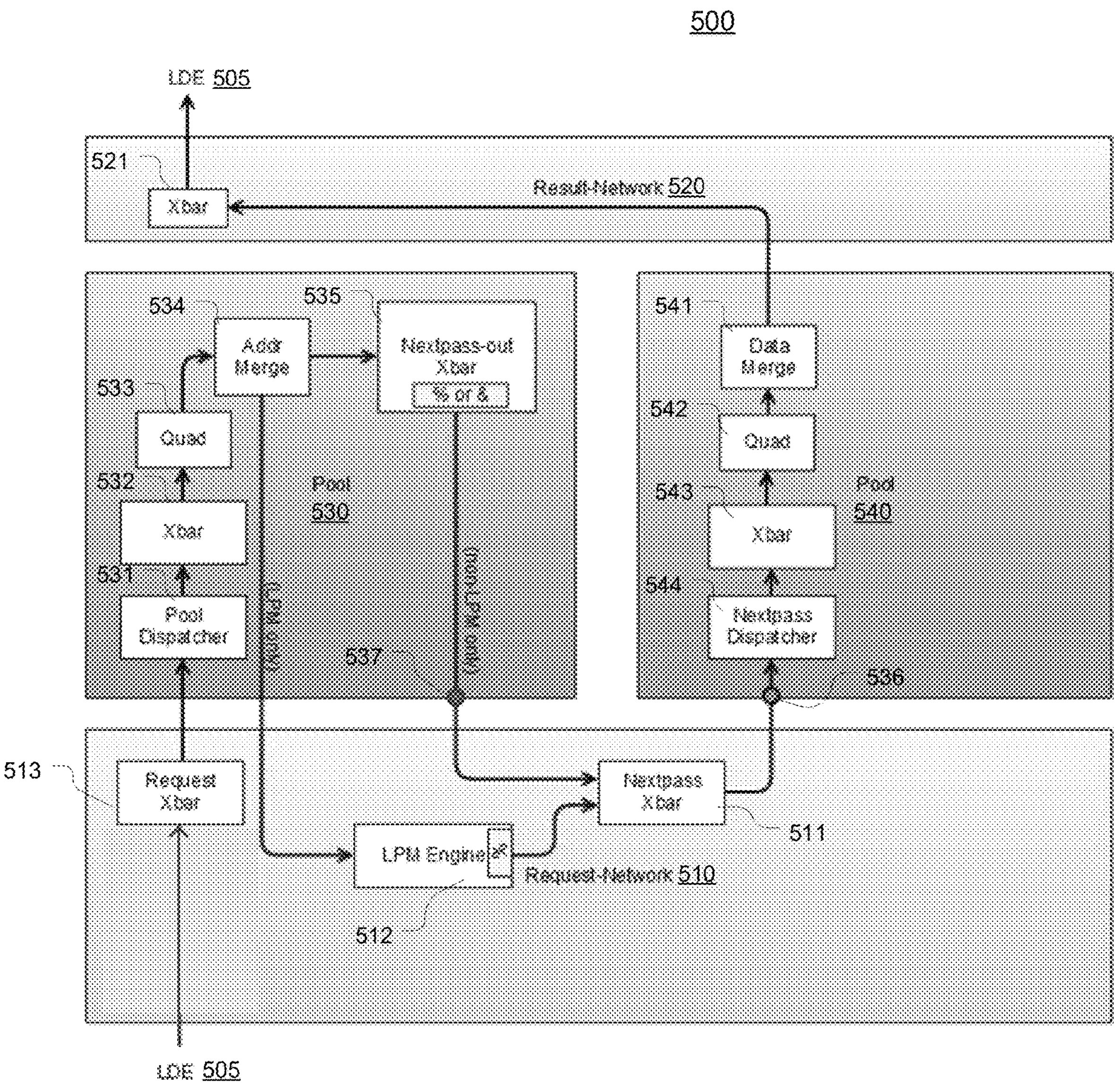
FIG. 5 illustrates the configuration of an exemplary search engine including next-pass logic in accordance with an embodiment of the present disclosure.

In the exemplary implementations described with reference to FIGS. 3-5 and Table 1, there are 8 next-pass request interfaces, or equivalently as noted as "ports" herein for each memory pool as shown in FIGS. 3-5. Ports 0-3 can compute the offset using a modulo operation (represented as "%" herein), namely offset % block_size. The remaining ports rely on block_size to be power of 2 and compute the offset using an AND operation (represented as "&" herein), offset & (block_size-1).

It will be appreciated that next-pass logic according to embodiments of the present disclosure may be implemented using any suitable architecture, algorithm, configuration, logic, circuitry or structures that is well known in the art. FIG. 4 illustrates an exemplary configuration of exemplary next-pass logic 400 in a search engine in accordance with an embodiment of the present disclosure. For generating a next-pass request, the next-pass logic receives a next-pass pool profile 420 including a next-pass table profile 406, the pool profile 420 having been configured for a packet. The next-pass logic 400 includes a request generator 410 for generating a next-pass lookup request ("nextpass_req"), and a control data processing module 430 for selecting offset or base from the control data.

During operation, the packet token 402 (e.g., having 128 bits) and the lookup table profile 420 are supplied to the control data processing module 430 which outputs the offset/base address. For example, the offset/base address is located at bits [31:0] of the data (e.g., corresponding to leaf data for LPM) contained in the first lookup result and includes 8-bit offset and 24-bit base address.

The output from the control data processing module 430, a portion of the master key (e.g., including the 40-bit parameter field 403 and the 16-bit byte-count 404), the table profile 406 including configurations for the destination table, and a hit address from the search result 401 are supplied to the request generator 410 to generate the next-pass request 405. Based on that input, the ALUs in the request generator 410 computes a next-pass address and thereby construct a lookup key according to a suitable address mode as shown in FIG. 3. For instance, the next-pass lookup request includes an indication for a direct index request, a target pool ID, and a target pool port.

The next-pass table profile 406 embodies the implementation that the next-pass logic 400 can generate up to two next-pass requests, one for a counting type lookup (the profile parameters are denoted with "count") and one for another type of lookup (the profile parameters are denoted with "lookup"), which may be executed in parallel. Thus, the table profile 406 specifies the parameters for both types of lookups. More specifically, profile 406 includes a bit-location indicating which bit in the result data should be checked ("nextpass_check_bit_in_rslt_data") and an indicator whether this checking function is enabled ("nextpass_ check_bit_index"). The table profile 406 also includes a next-pass lookup profile ID, the content of which is described in greater detail below. Also included are a lookup target pool ID and a lookup target pool port ID ("next-pass_lookup_tgt_ pool" and "nextpass_lookup_tgt_pool_ port"), base address shift ("nextpass_lookup_base_shift"), a key construction mode ("nextpass_lookup_key_mode"), a staring byte position of the master key used for constructing a next-pass lookup key ("nextpass_look-up_key_mkey_byte_start"), a counting lookup profile ID ("nextpass_count_profile_id"), a counting lookup target pool ID and the target pool port ID ("nextpass_coun-ting_tgt_ pool" and "nextpass_counting_tgt_pool_port").

The search engine operations with respect to next-pass lookups can be further configured by users through definitions of a number of parameters. As shown in Table 1, the user configurations can be compiled in a profile listing parameter names, widths of the parameters, and description of the parameters.

TABLE 1

| Name | Width | Description |
|---|---|---|
| nextpass_en | 1 | When set to"1," this parameter enables the next-pass function, including generating an outgoing (e.g., Pool-LA) next-pass lookup request with an optional next-pass counting request. |
| nextpass_num_dlanes | 3 | The value of this parameter represents the number of data lanes reserved for a next-pass operation.<br>If this value is greater than the number of lanes reserved for lookup result ("rslt_lane_count"), then all rslt_lane_count lanes belong to the next-pass lookup and nothing is returned for the first pass lookup.<br>If this value is less than rslt_lane_count, the starting lane reserved for the result of the next-pass request ("rslt_lane_start") is increased by the number of lanes returned with the first pass lookup (which is the difference between rslt_lane_count and the number of data lanes for next-pass ("next-pass_num_dlanes")); and rslt lane_count is decreased by the same amount. After the increase, the new rslt_lane_start may become smaller than the original rslt_lane_start (wrapped around). |
| direct_idx_param_byte_start | 6 | This value indicates the starting byte position of 40b direct-index parameters in the master key, arranged as:<br>{block size: 8b, base index: 24b, offset index: 8b}. Offset index can also passed to Longest Prefix Matching (LPM) engine as ECMP hash for next hop (NH) index computation. |
| key_byte_count_byte_start | 6 | This value indicates the starting byte position of {byte-count: 16 bit} data from the master key (for instance, the byte-count is only used in Pool-C for byte counters). |
| update_code_byte_start_or_update_code | 6 | A value of 0-47 in this field represents the starting byte position within the master key of 2-bit update code to be used in Pool-C.<br>A value of 48-51 in this field represents least-significant-bit (LSB) 2-bit is the update code (instead of coming from the master key).<br>The update code is as follows. 0: no update, 1: replace, 2: reserved, 3: increment. If the LDE request is not to be updated ("no_update" bit is set), then the update code is cleared to 0. |
| nextpass_check_disable_bit in rslt data | 1 | If this bit is "1," check the disable bit at "next-pass_check disable bit index" location within the LSB 32-bit of returning first pass lookup result data.<br>If the disable bit is 1, then the next-pass request is a non-operation (no counting but returning zeroed data results). |
| nextpass_check_disable_bit_index | 8 | This value represents the index of next-pass disable bit within LSB 32-bit of the returning first pass lookup result data. |
| nextpass_lookup_outport | 3 | This value represents a selected one of 8 next-pass lookup request output ports for use. |
| nextpass_lookup_num_dlanes | 3 | This value represents the number of data lanes reserved for next-pass lookup, leaving remainder for next-pass count (if it exists).<br>If this value is greater than the count available for next-pass (minimum of "next-pass_num_dlanes or rslt_lane_count"), then all next-pass lanes are used for next-pass lookup (no lanes for next-pass count). Else, |

TABLE 1-continued

| Name | Width | Description |
|---|---|---|
| | | rslt lane_start for the next-pass count request is increased by this value and rslt_lane_count is decreased by the same amount. After the increase, the new rslt_lane_start (for next-pass count) maybe smaller than the original rslt_lane_start (wrapped around). |
| nextpass_lookup_tgt_pool_prof_id | 3 | This value represents a next-pass profile ID that will be sent along with outgoing next-pass request to select the next-pass pool profile at the next-pass input port interface. |
| nextpass_lookup_tgt_pool | 3 | The value identifies one of the 6 memory pools to go to:<br>0: Pool 0<br>1: Pool 1<br>2: Pool 2<br>3: Pool 3<br>4: Pool 4<br>5: Pool 5 |
| nextpass_lookup_tgt_pool_inport | 4 | This value identifies a next-pass input port of the target pool to use. |
| nextpass_lookup_addr_mode | 2 | This value represents a next-pass address mode for constructing a next-pass lookup key:<br>0: Hit address 24b<br>1: (Hit address << shift) + offset index from the master key<br>2: LDE parameters (ECMP or source port accounting using LDE): 40b direct-index parameters from the master key {LDE block size: 8 bits, LDE base address: 24 bits, LDE offset index: 8 bits}.<br>3: 24-bit control data combined with 8-bit ECMP hash from the master key: {control data block size: 8 bits, control data base address: 16 bits}. Use the offset index from the master key. |
| nextpass_count_outport | 3 | This value identifies one of 8 next-pass request output ports to use for the extra counting only mode. If this is the same as nextpass_lookup_port, then there is no extra next-pass request. |
| nextpass_count_tgt_pool_prof_id | 3 | This value represents a next-pass profile ID that will be sent along with outgoing next-pass request to select the next-pass pool profile at the next-pass input port interface. |
| nextpass_count_tgt_pool | 1 | Two out of the six memory pools support counter tables. This value represents one of the 2 memory Pools to go to for counting. |
| nextpass_count_tgt_pool_inport | 4 | This value identifies a next-pass input port of the target pool to use. |
| nextpass_count_addr_mode | 2 | See nextpass_lookup_addr_mode. |
| nextpass_base_addr_msb_mask | 3 | This value indicates masking (or removing) up to 7 most-significant-bits (MSB) of the base address before shifting. |
| nextpass_base_addr_shift | 4 | This value indicates shifting left the 24-bit base address (16-bit for nextpass_lookup_addr_mode = 3) up to 8 bits before adding (offset_index % block_size). |
| nextpass_ignore_block_size | 1 | This value indicates not to include block size in address computation. |

FIG. 5 illustrates the configuration of an exemplary search engine 500 including next-pass logic in accordance with an embodiment of the present disclosure. For example, the search engine 500 includes circuitry configurable by the parameters defined in Table 1. The arrows indicate the exemplary process of generating a next-pass request, executing the next-pass request, and returning lookup results to an LDE 505 that is coupled to the search engine 500. The search engine includes a request network 510 and a result network 520, and the networks 510 and 520 includes a request crossbar 513 and crossbars 521, 532 and 543 as well as other communication channels coupled between the search engine 500 and LDEs. The search engine 500 further includes a pool dispatcher 531, lookup memory pools, e.g., 530 and 540, where each pool is divided into multiple segments (or "quads" e.g., 533). The next-pass logic in the search engine includes, or alternatively is coupled to, a next-pass crossbar 511 in the request network, and a next-pass output crossbar 535.

The next-pass crossbars interconnect memory pools and operate to route next-pass lookup requests from source pools to destination pools. For example, the next-pass crossbar 511 can direct next-pass requests from the next-pass output ports 537 of source memory pools to next-pass input ports 536 of destination memory pools. The configuration of an exemplary next-pass crossbar is described in greater detail with reference to FIG. 8.

During operation, for a parsed packet, the LDE 505 generates a first lookup request. If the LDE 505 determines that the packet needs multiple table lookups, it applies a configuration profile including next-pass configurations (e.g., as shown in Table 1 and table 406 in FIG. 4) to the packet. Based on the configuration profile, the request crossbar 513 routes the request to a pool dispatcher 531 which directs the request to the target pool 503 for the first lookup, and the crossbar 532 further directs the request to the selected memory quad 533 that contains the first lookup table. The search logic then performs search on the first lookup table.

If the next-pass function is enabled as indicated in the configuration profile, the next-pass logic provides two different paths, one configured for the cases that the first lookup is an LPM lookup, and one for the cases that the first lookup is not an LPM lookup. More specifically, if the first lookup is non-LPM, the next-pass address merger 534 reads the first lookup result, performs address merge and sends the output to the next-pass out crossbar 535 which construct a next-pass lookup key according to a selected address mode as shown in FIG. 3. The next-pass key is sent to a selected output port 535 as indicated in the configuration profile. For instance, the pool 530 has 8 next-pass output port, 4 ports using modulo operations and 4 ports using AND operations. For a direct index lookup, modulo operations are used to compute the index, as described in greater detail with reference to FIG. 3. The next-pass request is then sent to the next-pass crossbar 511, including the key, the first lookup result, the next-pass pool profile, and information extracted from the token and the master key.

On the other hand, if the first lookup is an LPM lookup, the next-pass address merger 534 sends all the intermediate results to the LPM engine 512 which operates to find the final longest prefix match. The next-pass request is then sent from the LPM engine 512 to the next-pass crossbar 511, including the key, the first lookup result, the next-pass pool profile, and information extracted from the token and the master key.

As indicated in the pool profile and other parameters in the configuration profile, the next-pass crossbar 511 can route the next-pass lookup request to pool 540 through a selected input port 536. For instance, 4 next-pass input ports are allocated to Pool L and Pool A, and 10 next-pass inputs ports are allocated to Pool C. Through the crossbar 543, the next-pass dispatcher 544 then routes the next-pass request to the quad 542 that contains the second lookup table. After the lookup is executed, next-pass data merger 541 merges the data in the first and the second lookup results, and sends the merged result back to the LDE 505 through the crossbar 521.

Figure 6:
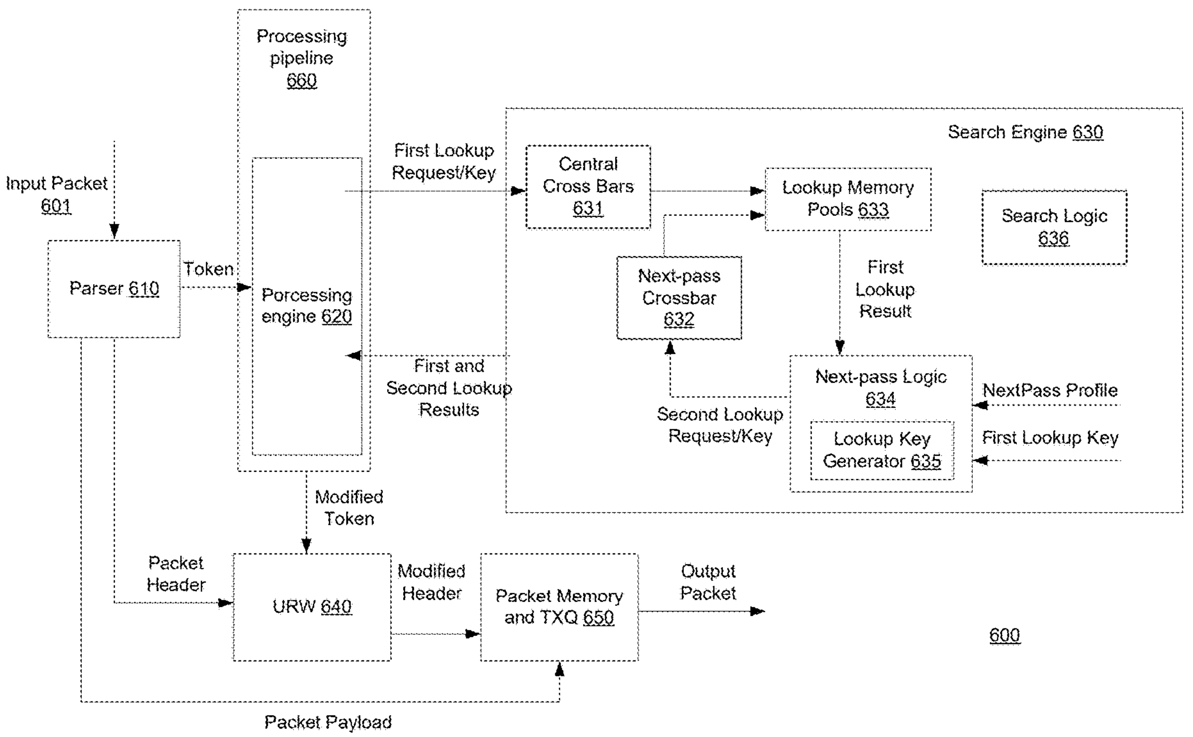
FIG. 6 illustrates the configuration of an exemplary network switch using next-pass logic in a search engine to process one or more chained lookup requests in accordance with an embodiment of the present disclosure.

FIG. 6 illustrates the configuration of an exemplary network switch 600 using next-pass logic in a search engine to process one or more chained lookup requests in accordance with an embodiment of the present disclosure. The network switch 600 includes a parser 610, at least one processing engine 620, a search engine 630, an updated Read Write (URW) module 640 and a packet memory and transmission queue (TXQ) 650. In some embodiments, the processing engine 620 can be an LDE in a processing pipeline. The parser 610 can parse the header of an input packet e.g., received through a communication network, and put control bits and the parsed headers in an input token which is supplied to the processing engine 620 and possibly additional processing engines. The parser 610 can also send the original packet header to the URW 640 as well as the original packet payload to the packet memory and transmission queue (TXQ) 650.

The processing engine 620 receives the input token and generates a first lookup request including a first lookup key and a master key, and a lookup profile. The lookup profile specifies configurations of the first lookup and next-pass lookups to be performed on the packet, such as the types of memory to be searched, key construction modes specific to the memory pool, the route (e.g., through particular lanes) to return lookup results, and so on. The request is sent to the search engine 630 through a communication channel.

The search engine 630 includes a central crossbar 631, lookup memories 633 arranged in pools and further in quads, the search logic 636, a next-pass crossbar 632, and next-pass logic 634 having a next-pass key generator 635. In response to the first lookup request, the central crossbar 631 directs it to the target pool in the memory pools 633 that stores the first lookup table. The search logic performs the first lookup on the table and produces a first lookup result. In case the next-pass logic is enabled and the search engine determines that next-pass lookup(s) is to be performed, the first lookup result is not supplied back to the processing engine 620. Rather, the first lookup result is supplied to the next-pass logic 634 for generating a next lookup request. The next-pass logic 634 also receives a next-pass configuration profile and the master key inherited from the first lookup. Accordingly, the next-pass logic 634 identifies a memory that maintains the second lookup table to be searched, and the key generator 636 therein constructs a next-pass lookup key based on a corresponding key construction mode. Via the next-pass crossbar 632, the second lookup request with the key is then directed to the memory that maintains the second lookup table.

Depending on the next-pass configuration for the packet, the next-pass logic 634 may generate more than one next-pass lookup requests to be executed in parallel in different lookup tables. Further, after the second lookup is performed, the next-pass logic 634 may generate one or more additional next-pass requests. The lookup results are returned to the requesting LDE after all the chained lookup are completed.

The first lookup result and the next-pass lookup result(s) are sent back to the processing engine 620. Based on these lookup results and the master key, the processing engine 620 can process the packet, e.g., modify the packet. In some embodiments, the conditions and/or rules of key generation and packet processing may all be programmable by software and are based on network features and protocols configured for the processing stage of the processing engine 620. More specifically, the processing engine 620 modifies the input token based on the lookup results, and the modified token is then sent to another processing engine in the processing pipeline 660 if needed. After all the lookups and token modifications are completed, the processing pipeline 660 outputs a final modified token to the URW module 640.

Accordingly, the URW module 640 modifies the packet header based on the modified token such that the header reflects the network features configured for the processing pipeline 660. The modified header is sent to packet memory and TXQ 650 where the original packet payload and the modified header are combined to form an output packet. The output packet can be further processed by the components in the network switch or forwarded to another device in the network.

Figure 7:
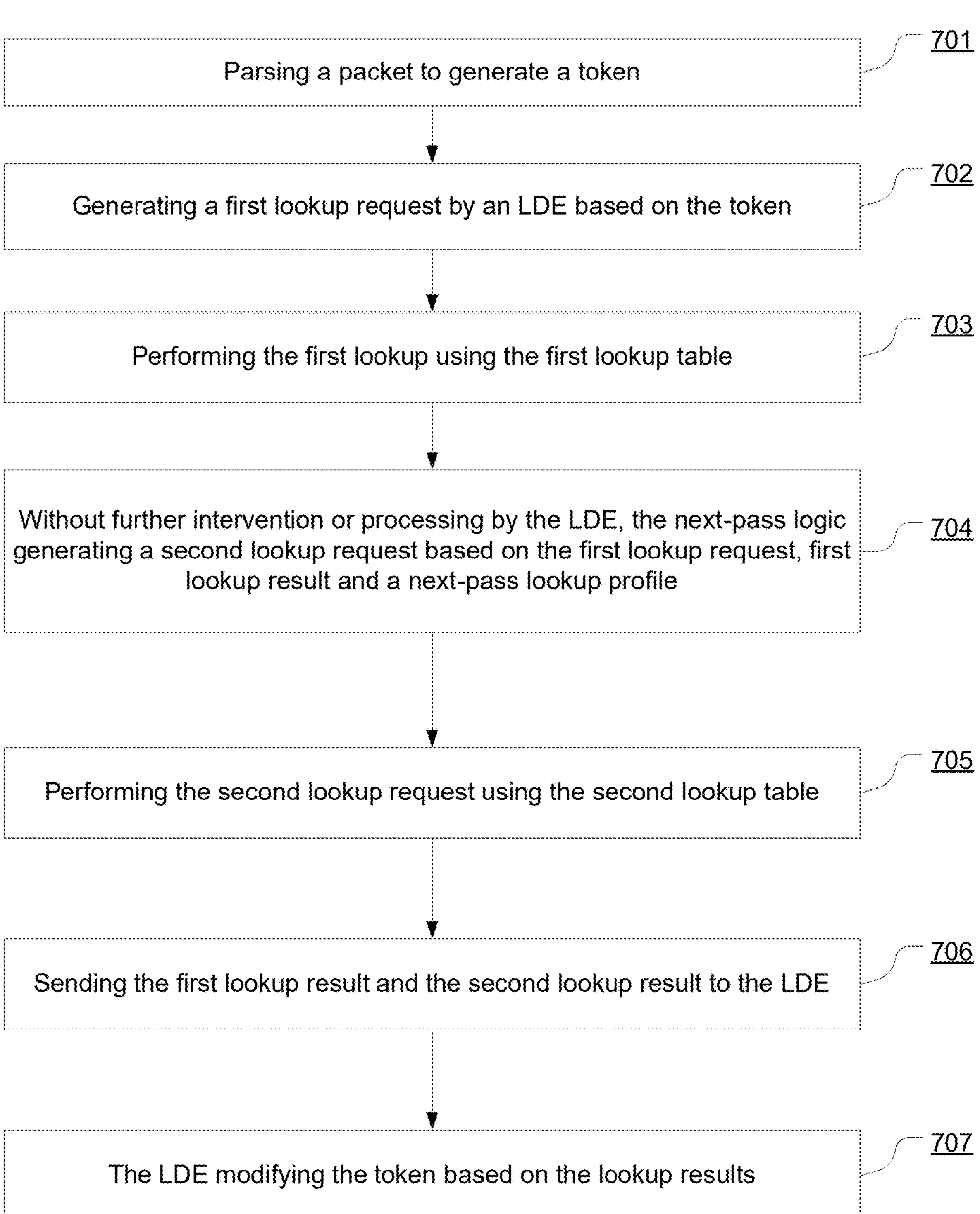
FIG. 7 is a flowchart depicting an exemplary process of performing chained lookups by using next-pass logic in a network switch in accordance with an embodiment of the present disclosure.

FIG. 7 is a flowchart depicting an exemplary process 700 of performing chained lookups by using next-pass logic in a network switch in accordance with an embodiment of the present disclosure. Process 700 may be performed by a network switch as shown in FIG. 6. At 701, a packet is parsed to generate a token. At 702, based on the token, an LDE generates a first lookup request, for example including a master key and a lookup configuration profile. The request may further contain a request ID and a lookup command enable indication, representing the type of the request and the search command to be used.

At 703, the search engine receives the first lookup request from the LDE, locates the first lookup table and executes the first lookup. If the first lookup yields a first lookup result, at 704, without further intervention or processing by the processing pipeline, the next-pass logic generates a second lookup request based on the first lookup result (e.g., control data in the result), the first lookup request (particularly the master key) and next-pass configuration profile. Therefore, the processing pipeline is advantageously not burdened with generation and processing of the second lookup request. At 705, the search logic locates the second lookup table and executes the second lookup. In some cases, the second lookup table may be a counting table, and the second lookup may only result in updating the table without returning any lookup result. In some other cases, a second lookup result is yielded from the second lookup.

At 706, the first look up result and the second lookup result are sent back to the requesting LDE. Accordingly, the LDE modifies the token based on the lookup results at 707. However, it will be appreciated that the present disclosure is not limited to which components utilize lookup results from chained lookups or how they are utilized.

Figure 8:
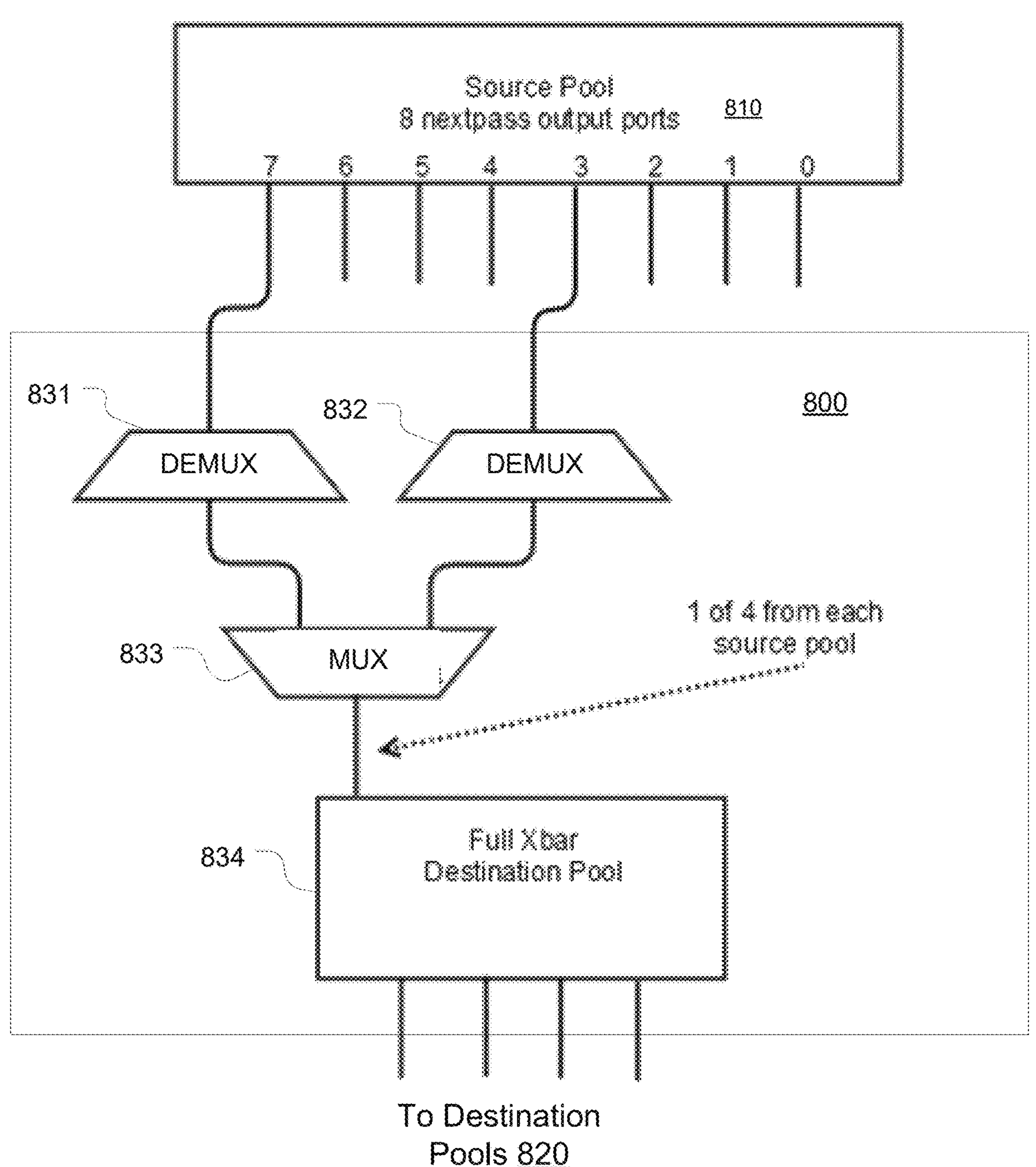
FIG. 8 illustrates the configuration of an exemplary next-pass crossbar operable of routing chained lookup requests in accordance with an embodiment of the present disclosure.

FIG. 8 illustrates the configuration of an exemplary next-pass crossbar 800 operable of routing chained lookup requests in accordance with an embodiment of the present disclosure. The crossbar 800 is implemented using demultiplexer (DEMUX) 831 and 832 from each source port (e.g., a port in the source pool 810) to each destination pool 820, coupled to a round-robin multiplexer (MUX) 833 to reduce the number of source pool number. The MUX 833 is coupled to a final full crossbar 834 before each destination pool. The round-robin MUX reduction operation combines the requests from the output ports i and i=4, where i=0, 1, 2 or 3. If there are multiple next-pass requests from one pool going to another pool, the contention between output ports i and i=4 can be resolved by multiplexing. The LPM engine sources are not affected by this multiplexing. However, it will be appreciated that a next-pass crossbar can be implemented in any other suitable manner that is well known in the art without departing from the scope of the present disclosure.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law. Any claimed embodiment of the invention does not necessarily include all of the objects or embodiments of the disclosure.

What is claimed is:

1. A network switch comprising a plurality of components, each respective component of said plurality of components of said network switch comprising computer-readable media comprising respective control logic that is executable by said respective component, said plurality of components comprising:

a processing engine configured to generate a first lookup key based on a packet received by said network switch; and a search engine coupled to said processing engine and configured to:

perform a first lookup using said first lookup key and a first lookup table of a plurality of lookup tables; and prior to sending a result of said first lookup to said processing engine, said search engine is further configured to:

generate a second lookup key for said packet based on said result of said first lookup; and perform a second lookup using said second lookup key and a second lookup table of said plurality of lookup tables.

2. The network switch as described in claim 1, wherein said processing engine is a Lookup and Decision-making Engine (LDE) in a processing pipeline comprising a plurality of LDEs, and wherein said plurality of LDEs is configured to process packets in multiple processing stages based on results of table lookups provided by said search engine.

3. The network switch as described in claim 1, said plurality of components further comprising a parser coupled to said processing engine and configured to parse said packet, wherein said processing engine is programmable and protocol-independent and is further configured to generate a master key based on a token resulting from parsing said packet.

4. The network switch as described in claim 3, wherein said search engine is further configured to generate said second lookup key based also on said master key and metadata provided by said processing engine, and wherein said metadata comprises an identification of said processing engine, a request identification, and identifications of data lanes used for returning data from said search engine to said processing engine.

5. The network switch as described in claim 1, wherein said search engine is further configured to perform said second lookup based also on a search configuration profile that specifies: a memory allocated for said second lookup table, a memory access interface for said second lookup, and a key construction mode.

6. The network switch as described in claim 1, wherein said search engine is further configured to concurrently supply said result from said first lookup and a result from said second lookup to said processing engine.

7. The network switch as described in claim 1, further comprising a plurality of memory pools, wherein each memory pool of said plurality of memory pools comprises memory selected from the group consisting of: static random access memory, and ternary content-addressable memory; and wherein said second lookup table is a table selected from the group consisting of: a direct index table, a hash table, a longest prefix matching table, a hybrid wild card matching table, and a packet accounting table.

8. The network switch as described in claim 1, wherein said search engine is further configured to receive a configuration parameter indicating enablement of said second lookup prior to said sending said result of said first lookup to said processing engine.

9. The network switch as described in claim 1, wherein said search engine is further configured to generate said second lookup key by computing an address of said second lookup table based on said result of said first lookup, and wherein said computing said address comprises selecting an address construction mode for said second lookup key from a plurality of address construction modes.

10. The network switch as described in claim 9, wherein said second lookup table comprises counters, and wherein said search engine is further configured to: generate a counting request and compute an address of a counter in said second lookup table to perform said second lookup.

11. The network switch as described in claim 1, wherein said search engine is further configured to:

generate a third lookup key for said packet based on a result of said second lookup, and instruct said processing engine to perform a third lookup using a third lookup table of said plurality of lookup tables.

12. The network switch as described in claim 1, further comprising:

a plurality of memory pools comprising said plurality of lookup tables; and a crossbar switch configured to direct a request for said second lookup from a memory pool of said plurality of memory pools comprising said first lookup table to a memory pool of said plurality of memory pools comprising said second lookup table.

13. The network switch as described in claim 1, further comprising a crossbar switch comprising a component of said plurality of components, said component comprising a longest prefix match (LPM) engine and coupled between said search engine and said processing engine, wherein said first lookup is an LPM lookup, and wherein said LPM engine is configured to:

process a request for said first lookup and generate said result of said first lookup from said LPM lookup, and send said result of said first lookup to said search engine.

14. A method of processing a packet in a network switch comprising a plurality of components, each respective component of said plurality of components of said network switch comprising computer-readable media comprising respective control logic that when executed performs said method, said method comprising:

generating, by a processing engine of said plurality of components, a first lookup key for a packet received by said network switch;

performing, by a search engine of said plurality of components, a first lookup using said first lookup key and a first lookup table; and prior to said search engine sending a result of said first lookup to said processing engine, said search engine:

generating a second lookup key for said packet based on said result of said first lookup; and performing a second lookup using said second lookup key and a second lookup table.

15. The method as described in claim 14, further comprising:

parsing said packet to generate a token; and generating a master key based on said token, wherein said second lookup key is generated based also on said master key and metadata, said metadata comprising: an identification of said processing engine, a request identification, and information on data lanes used for returning data from said search engine to said processing engine.

16. The method as described in claim 14, wherein said second lookup is also based on a lookup configuration profile that specifies: a memory allocated for said second lookup table, memory ports for said second lookup, and a key construction mode.

17. The method as described in claim 14, further comprising processing said packet in a processing pipeline of said network switch, wherein said processing pipeline comprises a plurality of processing engines of said plurality of components including said processing engine, and wherein said processing pipeline is configured to process packets in multiple processing stages based on results of table lookups provided by said search engine.

18. The method as described in claim 14, wherein said second lookup key is generated by computing an address of said second lookup table based on said result of said first lookup, and wherein said computing said address comprises selecting an address construction mode for said second lookup key from a plurality of address construction modes.

19. The method as described in claim 14, further comprising:

generating a third lookup key for said packet based on a result of said second lookup; and instructing said search engine to perform a third lookup using said third lookup key and a third lookup table.

20. The method as described in claim 14, wherein said network switch further comprises a plurality of memory pools and a crossbar switch, said plurality of memory pools comprising a plurality of lookup tables including said first and second lookup tables, said method further comprising directing a request for said second lookup from a memory pool of said plurality of memory pools comprising said first lookup table through said crossbar switch to a memory pool of said plurality of memory pools comprising said second lookup table.

* * * * *